United States Patent [19]

Erickson

[11] 3,898,858
[45] Aug. 12, 1975

[54] SOFT ICE CREAM MACHINE
[76] Inventor: V. Robert Erickson, 8015 S.W. Oleson Rd., Portland, Oreg. 97223
[22] Filed: Sept. 14, 1973
[21] Appl. No.: 397,447

[52] U.S. Cl. .................. 62/135; 62/202; 62/342
[51] Int. Cl. ............................................ F25c 7/10
[58] Field of Search ......... 62/135, 342, 202; 236/99

[56] References Cited
UNITED STATES PATENTS
1,630,294  5/1927   Foote .............................. 62/135 X
2,022,440  11/1935  Slough ............................... 236/94
2,930,203  3/1960   Koch ................................. 62/135
3,279,205  10/1966  Stoelting ......................... 62/342 X Primary Examiner—William E. Wayner
Assistant Examiner—James C. Yeung
Attorney, Agent, or Firm—Eugene M. Eckelman

[57] ABSTRACT

A freezing barrel has an inlet at one end to receive a prepared mix to be frozen and has a spigot at the other end for dispensing the ice cream. A motor driven mixing mechanism within the freezing barrel is operative to freeze the ice cream as well as to maintain it in a serving condition and to dispense it. A refrigerating system is associated with the freezing barrel and is controlled by thermostatic sensing means at the front of the freezing barrel having sensing relation directly with the ice cream. The prepared ice cream mix is supplied from a reservoir having a float controlled uniform rate of flow to the freezing barrel in each operation.

8 Claims, 5 Drawing Figures

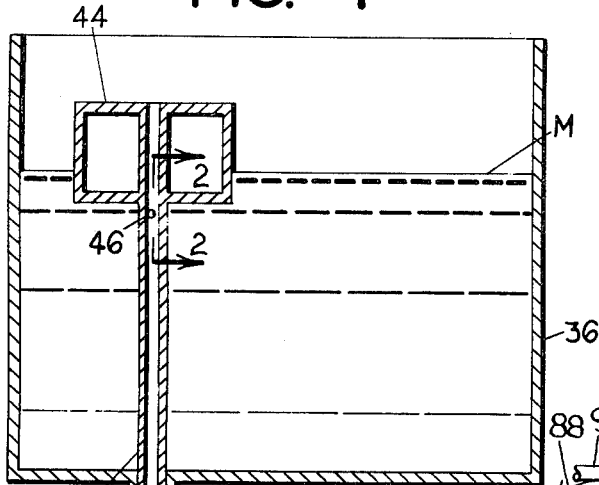
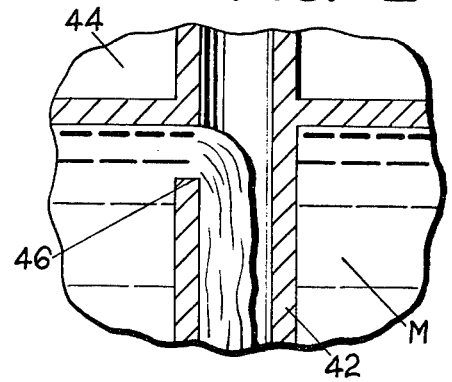
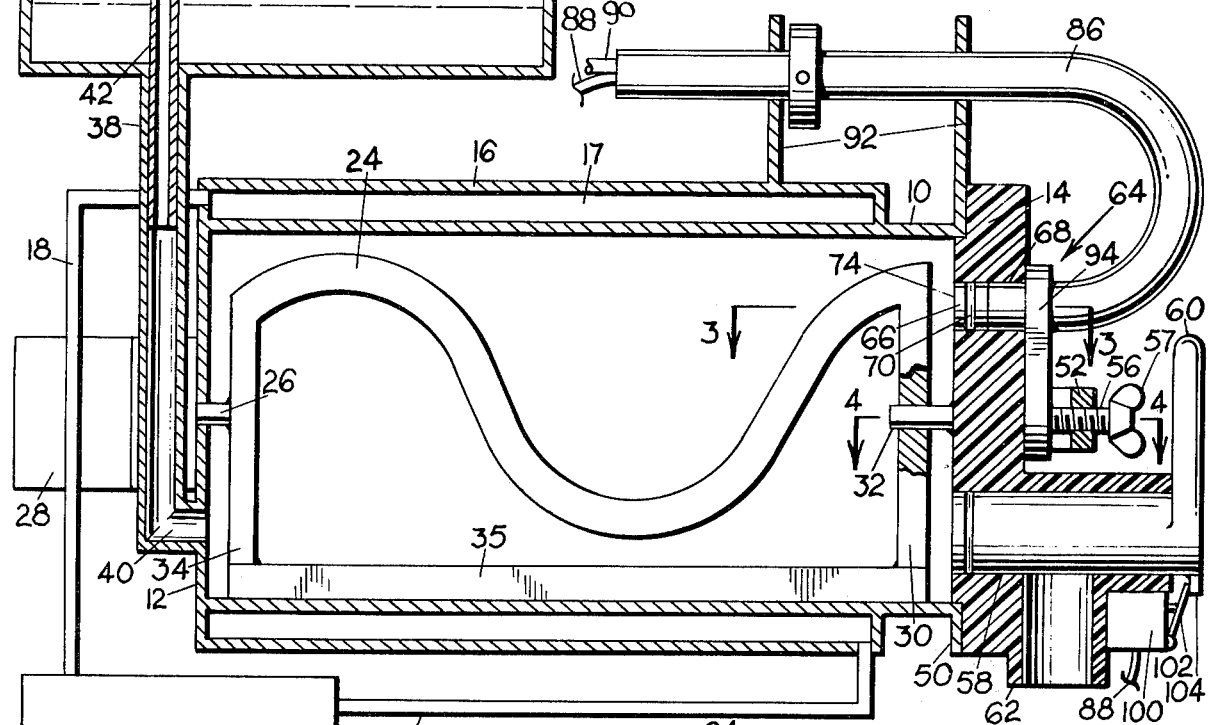
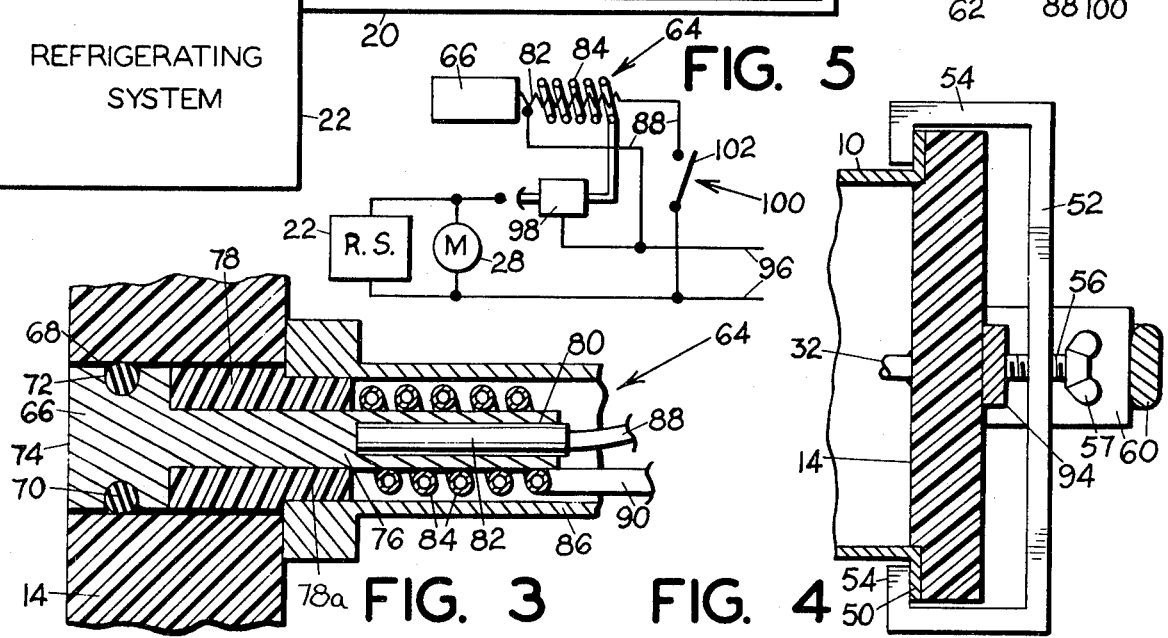

SOFT ICE CREAM MACHINE

BACKGROUND OF THE INVENTION

This invention relates to new and useful improvements in machines for making soft ice cream.

It is well known in the art of forming soft ice cream in machines designed for such purpose that excess temperature fluctuations in the freezing barrel of the machines result in the formation of an inferior quality of ice cream. For one thing, the ice cream will not have the desired smooth consistency but rather will have a crystalline-type grain which is undesirable. Some prior devices have controlled the temperature by sensing means associated with the wall of the freezing barrel and some prior art devices sense the temperature by pulley tension on a drive motor which operates agitating and dispensing means in the freezing barrel. These prior temperature control and sensing means do not maintain the precise accuracy for producing the smooth and uniform consistency of ice cream desired by applicant.

It is also well known in the art of soft ice cream making that the ice cream will not be of the proper consistency if the inlet of the ice cream mix into the freezing barrel is not precisely controlled with relation to the freezing capabilities of the refrigerating means. A too fast rate of inlet of the mix may occur for example from an excessive head pressure in the inlet. Furthermore, the amount of overrun, namely, the volume of air admixed into the ice cream, is important to the consistency of the ice cream and a desired overrun can only be maintained by a substantially uniform temperature being maintained in the freezing barrel and by a uniform inlet of air with the inlet of the ice cream mix.

SUMMARY OF THE INVENTION

According to the present invention and forming a primary objective thereof, an ice cream machine is provided for making soft ice cream which incorporates improved temperature sensing means for the freezing barrel and which also provides a novel uniform rate of inlet for the ice cream mix from one operation to the other, all to the advantage that a smooth consistency ice cream and an evenly maintained overrun therein is accomplished.

A more particular object of the present invention is to provide temperature sensing means for the freezing barrel of a soft ice cream machine which senses directly the temperature of the ice cream itself.

Another object is to provide inlet means from a storage tank in the freezing barrel of a soft ice cream machine which accomplishes a uniform rate of flow in all inlet operations.

The invention will be better understood and additional objects and advanages will become apparent from the following description taken in connection with the accompanying drawings which illustrate a preferred form of the device.

BRIEF DESCRIPTION OF THE DRAWINGS

FIG. 1 is a sectional view, somewhat diagrammatic, taken longitudinally and vertically through an ice cream machine incorporating features of the present invention;

FIG. 2 is an enlarged fragmentary sectional view taken on the line 2—2 of FIG. 1 and showing a portion of inlet means for admitting ice cream mix to the freezing barrel;

FIG. 3 is an enlarged fragmentary sectional view taken on the line 3—3 of FIG. 1 and showing electrical temperature sensing means forming a part of the invention;

FIG. 4 is a fragmentary sectional view taken on the line 4—4 of FIG. 1; and

FIG. 5 is a wiring diagram showing electrical operating means for the ice cream machine.

DETAILED DESCRIPTION OF A PREFERRED EMBODIMENT

With particular reference first to FIG. 1, the ice cream machine of the present invention contains a tubular freezing barrel or chamber 10 having a rear wall 12 and a front wall 14. An outer wall 16 surrounds the freezing barrel and forms a cooling chamber 17 associated with an inlet conduit 18 and an outlet conduit 20 of a refrigerating system 22. The refrigerating system 22 is of well known construction and is therefore not detailed.

The freezing barrel 10 has a longitudinally disposed mixing arm 24 of well-known construction secured at one end on a shaft 26 extending through the rear wall 12 of the barrel 10 and comprising the output shaft of a motor and gear reduction mechanism 28. The forward end of the mixing arm 24 has a transverse extension 30 journaled on a rearwardly extending stub shaft 32 integral with the front wall 14, and secured on the end of this extension and on a transverse extension 34 of the arm 24 at the rearward end of the barrel is a scraper blade 35 the outer edge of which is adapted to scrape frozen ice cream from the inside of the barrel upon rotation of the mixing arm 24. The removal of the frozen ice cream from the inner surface of the barrel and the mixing action by the arm 24 forms the soft ice cream and maintains it in a uniform consistency ready to serve in a well known manner. Scraper blade 35 and mixing arm 24 are of a shape or otherwise arranged in a well known manner such that the ice cream is urged forward for dispensing.

The ice cream is formed from a prepared mix M stored in a reservoir 36 above the barrel 10. This reservoir may comprise a tank mounted on the barrel 10 in any suitable manner such as by a hollow tubular support 38 projecting integrally upwardly along the rear wall of the barrel 10, the bottom of the tubular support 38 communicating with a port 40 opening into the freezing chamber 10 preferably adjacent to the bottom of the latter. The upper end of the tubular support 38 opens into the reservoir 36 from the bottom.

An open ended hollow stem 42 in the reservoir 36 is slidably engaged in the tubular support 38 and carries a float 44 at its upper end. The float 44 moves up and down with the ice cream mix M with the lower end of the stem 42 slidably adjusting in the support 38. Stem 42 has an inlet opening 46 adjacent its upper end, for example, just below the bottom of float 44, through which the ice cream mix enters the stem 42 and flows down through the support 38 for feeding to the barrel 10 through port 40. The inlet opening 46 is of selected dimension such that maximum rate of flow therethrough is equal to or slightly more than the freezing and mixing capacity of the freezing barrel, and since this opening is always at the same position with relation to the top surface of the mix and the head pressure in the inlet does not vary, the rate of flow of the mix into the freezing barrel will be identical from one operation to the next.

The front of the freezing barrel 10 has an outwardly extending flange 50, FIGS. 1 and 4, on which the front wall 14 is removably supported in clamped relation by a bracket 52 having hook-shaped arms 54 which engage behind the flange 50. A setscrew 56 with a wing head 57 is threadedly mounted in the bracket 52 and holds the front wall 14 in place on the freezing barrel in association with structure to be hereinafter described.

Front wall 14 has an outlet 58 with a valve 60 therein which controls the flow of ice cream by in and out movement thereof through a downwardly directed spout 62 communicating with the outlet.

Temperature control means, designated generally by the numeral 64 and shown best in FIGS. 1 and 3, are associated with the front wall 14 and are operative to control the on-off functioning of the refrigerating system 22 and the motor mechanism 28 of the shaft 26. Such control means comprises a sensing head 66 disposed in an aperture 68 in an upper portion of the front wall 14 and sealed in said aperture by an O-ring 70 supported in a groove 72 in the head. The head 66 has a rear or inner face surface 74 which is disposed substantially flush with the inner surface of the front wall 14. Head 66 has a reduced portion or stem 76 which projects forwardly of the front wall and has a sleeve 78 thereon of a length to project forwardly a short distance beyond the front surface of the wall 14 but shorter than stem 76.

Fitted in a rearwardly opening aperture 80 in the stem 76 is an electrical heating element 82, and disposed around the stem in the area of the heating element is a capillary tube-type thermostat 84 adapted to operate the refrigerating system 22 as well as the motor 28 upon a warming of the stem 76 by the heating element or by warming temperatures contacting the head 66.

The sensing head 66 and its stem 76 are constructed of a heat conducting material such as copper in order that temperature conditions at the inner end or face portion 76 of the head are transferred to the area of the thermostat 84. The forward portion of head 66 is plated if necessary to prevent reaction thereon from acid in the ice cream.

Sleeve 78 is of sufficient length to have a front projecting portion 78a, and fitted on this projecting portion is one end of a tubular housing or conduit 86. This housing encloses the thermostat and has a reverse or rearward turn with a portion thereof extending along the top of the machine for enclosing wires 88 from the heating element 82 and conduit 90 from the thermostat 84 and other control equipment as necessary. The upper rearwardly extending portion of the housing 86 is supported on a pair of upright brackets 92 integral with the freezing barrel. Housing 86 has a depending arm 94 which is adapted for engagement by the setscrew 56 in the bracket 52 so that the setscrew serves not only to clamp the front wall on the machine but also to clamp the housing 86 for the temperature control means in place.

Front wall 14 is preferably constructed of a heat insulating material, such as rubber or well known plastic materials, in order that there will be a minimum of influence of the front wall on the sensing head 66. Furthermore, the sleeve 78 is made of a heat insulating material in order that the housing 86 is isolated from the sensing head 66.

With regard to the operation of the present machine, reference is first made to FIG. 5. This figure comprises a wiring diagram which is greatly simplified and included only for the purpose of illustrating such operation. It is to be understood that other control features may be included in the wiring diagram but since such features are common in the art and are not critical to the present invention, they are not shown. A pair of feed wires 96 supply current to the refrigerating system 22 and to the motor mechanism 28 which drives the mixing arm 24. Incorporated in one of these feed lines is a pressure sensitive switch 98 operated by the thermostat 84. The wires 88 for the heating element 82 are connected into respective feed wires 96, and one of the wires 88 includes a normally closed switch 100 therein having a switch arm 102 held in the open position of the switch by a projection 104 on the valve 60 when the latter is closed. The arrangement is such that when the valve 60 is closed it opens the switch 100 but when the valve 60 is opened to draw ice cream from the freezing barrel the switch 100 closes to energize the heating element 82.

Thus, according to the arrangement shown, when the operator draws off ice cream, the heating element 82 is energized and the thermostat, being heated, closes the pressure sensitive switch 98 to start the refrigerating system and the drive motor mechanism 28 for the mixing arm 24. When the operator closes the valve 60, the switch 100 is opened to cut off current flow to the heating element 82. In view of the residual heat in the head 66 the switch 98 will remain closed to maintain the refrigerating system and the drive motor mechanism 28 in operation for a short while. The refrigerating system 22 and drive motor mechanism 28 will remain in operation as long as the residual heat in the head 66 is sufficient to keep switch 98 closed. Upon drawing off ice cream through the valve 60, mix will be introduced from the reservoir 36 and this mix, being warmer than the ice cream, will also influence operation of the refrigerating system 22 and the drive motor mechanism 28 under the control of the thermostat 84 and switch 98.

With the machine standing idle, the head 66 will sense any warming function in the freezing barrel and immediately turn on the refrigerating system and the mixing motor mechanism to maintain the freezing temperature range which produces a smooth serving consistency.

The present ice cream machine by its construction and operation thus makes a better ice cream due to its accurate sensing of the temperature by the head 66 and by the uniform rate of introduction of the ice cream mix from the reservoir 36 into the freezing chamber. That is, the head 66 having a sensing surface 74 directly exposed to the ice cream provides for maximum sensing so that the temperature can always be kept within the limits desired. Also, the inlet stem 42 and its inlet port 46, being adjustable vertically by the float 44 as the mix M varies in height in the reservoir, provides an identical head pressure in all intake operations and thus an identical rate of inflow of the mix. The opening 46 is of selected diameter to limit the maximum rate of flow desired. With the upper end of the stem 42 being open, air is admitted with the mix to provide the desired amount of overrun.

According to the present invention, the accurate sensing and maintaining of the temperature in the freezing barrel and the accurate rate of inflow of the mix, as well as the introduction of the air into the mix, produces an ice cream of improved quality in that the serving consistency is maintained, the crystalline grains growth normally caused by fluctuating temperatures is at a minimum, and the desired overrun is maintained.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An ice cream machine of the continuous dispensing type for making and dispensing soft ice cream comprising
   a. a freezing barrel having opposite ends and enclosing side walls with an interior surface defining a freezing and mixing chamber,
   b. an inlet adjacent one end of said freezing barrel for admitting mix into said chamber,
   c. an outlet valve adjacent the other end of said freezing barrel for discharging ice cream,
   d. means in said chamber for mixing said ice cream and forcing it from said outlet valve,
   e. a cooling chamber surrounding at least a portion of said freezing barrel,
   f. refrigerating means associated with said cooling chamber for cooling the freezing barrel,
   g. thermostat means controlling the operation of said refrigerating means to cause operation of the latter at a selected sensing temperature,
   h. temperature sensing means for said thermostat means,
   i. and insulated support means supporting said temperature sensing means on said freezing barrel adjacent said other end in isolated relation from the temperature influence of the enclosing walls of said freezing chamber and said cooling chamber,
   j. said sensing means comprising a head portion of heat conductive material,
   k. said head portion being supported such that an end surface thereof is exposed interiorly to the freezing and mixing chamber for directly sensing the temperature of the ice cream adjacent the outlet.

2. The ice cream machine of claim 1 including releasable clamp means removably supporting said head portion in said insulated support means.

3. The ice cream machine of claim 1 wherein said head portion has a body extension projecting outward from said insulated support means, means defining an end opening in the projecting end of said body extension, heating means removably supported in said opening having an energized condition upon opening of said outlet valve, said thermostat means including a temperature responsive element mounted on the projecting end of said body portion for influence by temperature conditions from said head and also from said heating means.

4. The ice cream machine of claim 3 wherein said head portion and body extension are arranged upon de-energization of said heating means to retain sufficient heat to maintain for a short while a sensing temperature sufficient to operate said refrigerating means.

5. The ice cream machine of claim 3 including a housing enclosing the projecting end of said body extension, and heat insulated mounting means removably securing said housing on said body extension.

6. The ice cream machine of claim 1 including a reservoir for ice cream mix to be admitted into said freezing and mixing chamber, passageway means extending between said reservoir and said freezing and mixing chamber for admitting said mix to the freezing and mixing chamber, and inlet means for said passageway means adjustable vertically in said reservoir to follow selectively the level of mix in the latter whereby to maintain a constant head pressure in said passageway means.

7. The ice cream machine of claim 6 wherein said inlet means includes a float arranged to be supported on the mix for accomplishing said vertical adjustment of the inlet means.

8. The ice cream machine of claim 6 wherein said passageway means includes an upright conduit and a hollow stem slidable in said conduit extending upwardly into said reservoir, a float on said hollow stem arranged to be supported on the mix for accomplishing said vertical adjustment of the inlet means, and means defining an aperture in said stem for inlet of the mix into the passageway means.

* * * * *